United States Patent [19]

Holmes

[11] Patent Number: 4,896,639
[45] Date of Patent: Jan. 30, 1990

[54] METHOD AND APPARATUS FOR ENGINE CONTROL AND COMBUSTION QUALITY DETECTION

[75] Inventor: Michael Holmes, Solihull, England

[73] Assignee: Lucas Industries public limited company, Birmingham, England

[21] Appl. No.: 130,620

[22] Filed: Dec. 9, 1987

[30] Foreign Application Priority Data

Dec. 9, 1986 [GB] United Kingdom ............... 8629346

[51] Int. Cl.⁴ ..................... F02P 5/15; F02D 41/26
[52] U.S. Cl. ................................. 123/419; 123/425; 123/435; 123/436; 364/431.08
[58] Field of Search ............... 123/419, 425, 435, 436; 364/431.05, 431.07, 431.08

[56] References Cited

U.S. PATENT DOCUMENTS

| | | | |
|---|---|---|---|
| 4,389,992 | 6/1983 | Shigematsu et al. | 123/419 |
| 4,479,476 | 10/1984 | Suzuki et al. | 123/436 X |
| 4,502,442 | 3/1985 | Takakuwa et al. | 123/419 X |
| 4,503,824 | 3/1985 | Ninomiya et al. | 123/436 |
| 4,509,477 | 4/1985 | Takao et al. | 123/436 X |
| 4,513,718 | 4/1985 | Ishii et al. | 123/425 |
| 4,527,524 | 7/1985 | Guipaud | 123/425 |
| 4,527,526 | 7/1985 | Akasu | 123/425 |
| 4,539,957 | 9/1985 | Haraguchi et al. | 123/425 |
| 4,596,217 | 6/1986 | Bonitz et al. | 123/425 |
| 4,715,344 | 12/1987 | Tomisawa | 123/489 |

Primary Examiner—Willis R. Wolfe
Attorney, Agent, or Firm—Nixon & Vanderhye

[57] ABSTRACT

An engine control and combustion quality detection system and method are provided for an internal combustion engine having at least one control input such as spark advance angle or air/fuel ratio. A base value is established for the control input and the control input is periodically perturbed about the base value. A sensor senses an engine parameter such as knock or engine roughness representing the combustion quality of the engine and provides an output representing this engine parameter. A slope calculation device receives the output from the sensor when the control input is being perturbed about the base value and determines the slope or differential of the output from the sensor to determine the engine parameter as a function of the control input, thereby to provide an indication of combustion quality of the engine. By determining the combustion quality of the engine by calculating the slope of the sensor output when the perturbation device perturbs the first control input about the established base value, the noise component of the sensor output is substantially eliminated. The slope of the sensor output should be at or close to zero when combustion quality is acceptable.

40 Claims, 11 Drawing Sheets

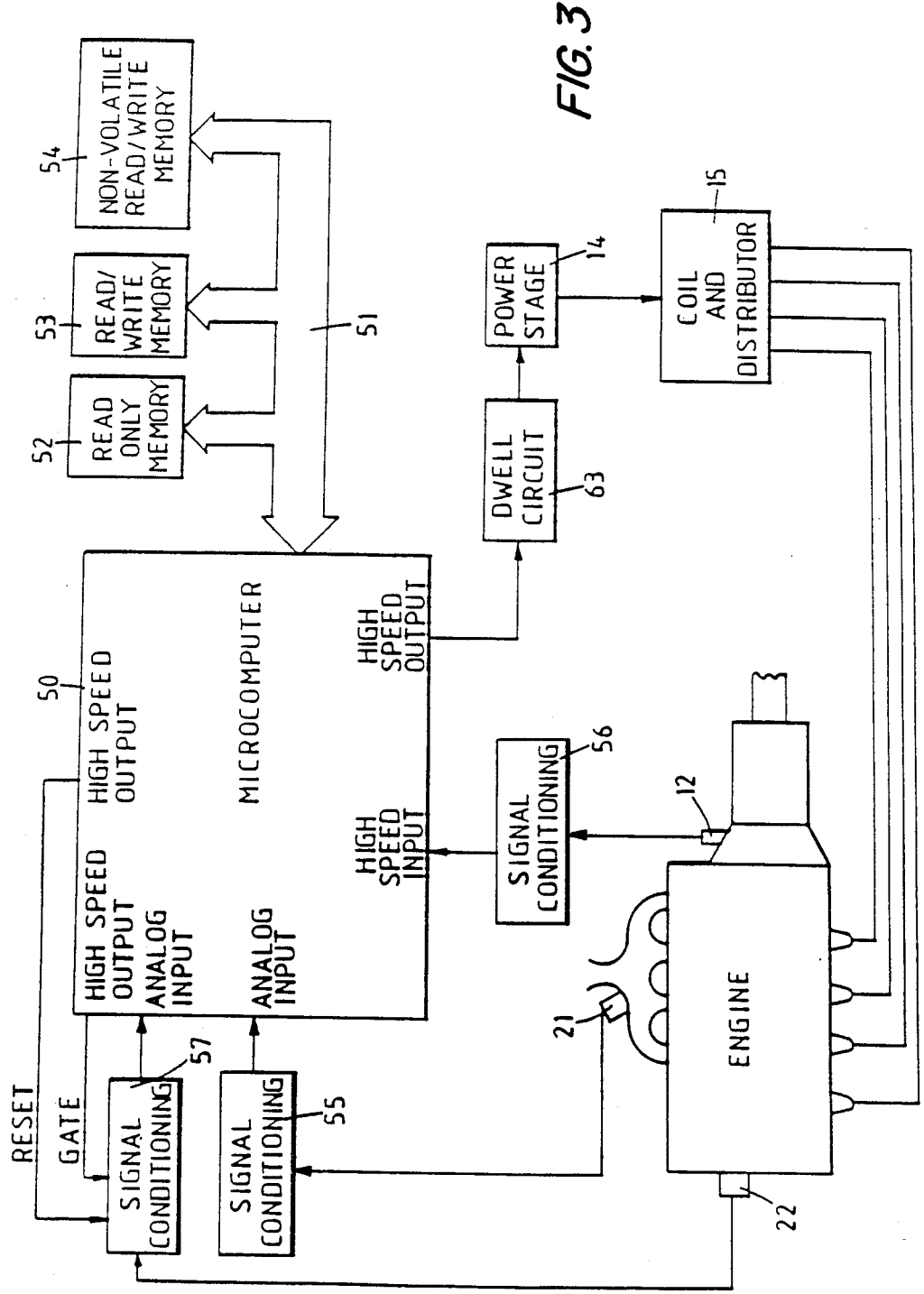

METHOD AND APPARATUS FOR ENGINE CONTROL AND COMBUSTION QUALITY DETECTION

BACKGROUND OF THE INVENTION

1. Field of the Invention

This invention relates to an engine control and combustion quality detection system for an internal combustion engine and also to a method of detecting combustion quality in such an engine.

2. Discussion of the Prior Art

Knock in an internal combustion engine causes damage to the engine and a reduction in power output. In spark ignition engines, differences between engines and the build up of deposits cause the spark advance angle at which knock occurs to vary considerably between engines. It is therefore desirable to provide a system which can detect knock accurately.

It is already known to use a knock sensor for detecting knock. Such a knock sensor may take the form of a piezo-electric sensor mounted on a cylinder block or a pressure sensor mounted inside an engine cylinder. These prior art systems suffer from problems of identifying the level of sensor output which corresponds to noise rather than to a genuine knock signal. Various measures are used to distinguish the genuine knock signal from the noise signal, and these include bandpass filtering to select the characteristic knock frequency, gating the output of the knock sensor so as to select the region in which knock occurs, and making the knock threshold adaptive. However, none of these measures provides a satisfactory solution to the problem of identifying the genuine knock signal.

In U.S. Pat. No. 4,454,750, the output of a knock sensor is compared with a background reference signal. In order to obtain the background reference signal, the sensor output is sampled and the resulting signal is averaged. With the intention of removing the knock component from the background reference signal, sampling is controlled by comparing the output of the knock sensor with a threshold which is established as being proportional to the background reference signal. However, this system suffers from the disadvantage that an error in establishing the threshold for sampling will result in an error in the background reference signal.

In European Pat. No. 155,680, a spark ignition engine is provided with a knock sensor and the output of the knock sensor is compared with a threshold. At periodic intervals, the threshold is recalibrated by gradually advancing the spark advance angle until there is a sudden increase in sensor output and then judging this point to be the knock threshold. This system suffers from the disadvantage that the gradual advancing of the spark ignition angle is not compatible with normal driving conditions.

A similar problem occurs in measuring engine roughness. When measuring engine roughness, a problem is caused by background noise due to road irregularities and difficulty in distinguishing genuine engine roughness from engine speed fluctuations caused by these road irregularities.

The term "knock" refers to high frequency fluctuations in cylinder pressure in one combustion event. "Engine roughness" refers to fluctuations in engine speed between successive ignition cycles. In this specification, the term "combustion quality" means "knock" or "engine roughness."

SUMMARY OF THE INVENTION

It is an object of this invention to provide a new engine control and combustion quality detection system and also a new method of detecting combustion quality in which the above problems in identifying the genuine signal are overcome or reduced.

The invention provides an engine control and knock detection system for an internal combustion engine having at least one control input, said system comprising a knock sensor means for establishing a base value for a first control input, means for periodically perturbing the first control input about the base value, and means for determining the knock quality value as the slope of the output of the knock sensor with respect to the first control input.

According to one embodiment of the invention, there is provided an engine control and combustion quality detection system for an internal combustion engine having at least one control input (such as spark advance angle or air/fuel ratio). The system includes means for establishing a base value for the control input, a perturbation means for periodically perturbing the control input about the base value, a sensor for sensing an engine parameter (such as knock or roughness) representing combustion quality and providing an output representing the engine parameter, and a slope calculation means receiving the output from the sensor when the perturbation means perturbs the control input about the base value, for determining a slope or differential of the output from the sensor, thereby to determine the engine parameter as a function of the control input and to provide a signal indicating the combustion quality of the engine.

The invention is based on the underlying concept that by determining the combustion quality of the engine by calculating the slope or differential of the sensor output when the perturbation means perturbs the first control input about the established base value, the noise component of the sensor output is substantially eliminated. The slope or differential of the sensor output should be close to zero when combustion quality is acceptable.

Preferably, where the combustion quality is knock, the sensor is a device for sensing knock induced vibrations arising in said engine. Also preferably, where the combustion quality is knock, the first control input is an ignition timing input, and where the engine is a spark ignition engine, the first control input may be the spark advance angle. Preferably, where the combustion quality is engine roughness, the first control input is air/fuel ratio.

Desirably, the system includes means for establishing a base value for a particular control input, and means for correcting the base value of the particular input in accordance with the combustion quality value. The correcting means may include means for correcting the base value by a fixed amount when the combustion quality value exceeds a threshold value. The correcting means may include a correction schedule in which correction values of the particular control input are stored as a function of engine operating conditions, and means for updating the schedule in accordance with the combustion quality value.

In accordance with another embodiment of the invention, there is provided an adaptive control system for an automobile, which includes an internal combustion engine having at least one control input, a means for establishing a base value for the control input, a perturbation means for periodically perturbing the control input about the base value, a sensor for sensing an engine parameter representing the combustion quality of the engine and providing an output representating the engine parameter, and a slope calculation means receiving the output from the sensor when the perturbation means perturbs the control input about the base value, for determining a slope of the output from the sensor thereby to determine the engine parameter as a function of the control input and to provide a signal indicating the combustion quality of the engine.

In accordance with yet another embodiment of the invention, there is provided an adaptive control system for an automobile as follows. This control system includes an internal combustion engine having at least one control input and a crank shaft. A position transducer generates a series of reference pulses representing rotational positions of the crank shaft. A further control device receives the reference pulses and provides an output signal. A speed calculation device provides an output signal indicating engine speed to the further control device. A load demand transducer measures a load demand parameter of the engine. A fixed schedule memory means stores data representing the control input as a function of engine speed and engine load demand. A control input calculation device is connected to (1) the fixed schedule memory means, (2) the speed calculation device and (3) the load transducer, and calculates a base value for the control input and provides this base value to a first summer. A perturbation means generates perturbation values for the control input and provides these values to a second summer which has an output connected to the further control device to provide a command value for the control input. The further control device controls the control input in accordance with the command value based on the output signal of the speed calculation device and the output of the position transducer. A sensor is provided for sensing an engine parameter (such as knock or engine roughness) representing combustion quality and provides an output representing this engine parameter. A slope calculation means receives the perturbation values from the perturbation means and the output of the sensor, and determines a slope of the output of the sensor to provide an output representing the engine parameter as a function of the control input. A control input correction memory stores values for correcting the control input responsive to the output of the slope calculation means. A third summer receives the output of the slope calculation means and a reference input and provides an output to a correction memory updating device. The correction memory updating device also receives the output of the speed calculation device and the output of the load demand transducer and provides an output to the control input correction memory to update the values stored in the control input correction memory. A control input correction calculation means receives (1) the output from the control input correction memory, (2) the output from the speed calculation device and (3) the output of the load demand transducer and provides an output to the first summer. Where the control input is an ignition timing input, the engine parameter is knock and the sensor is a knock sensor. Where the engine is a spark ignition engine, the control input is a spark advance angle. Where the control is an air/fuel ratio, the engine parameter is engine roughness and the sensor is an engine roughness sensor.

In accordance with a further embodiment of this invention, there is provided a method of detecting combustion quality in an internal combustion engine, said method comprising establishing a base value for a control input of the engine, periodically perturbing the first control input about the base value, and determining a combustion quality value as a slope of the output of a combustion quality sensor with respect to the control input.

BRIEF DESCRIPTION OF THE DRAWINGS

This invention and many of the advantages thereof will now be described in more detail by way of example, with reference to the accompanying drawings in which:

FIG. 3 is a block diagram of a microcomputer system which implements the functional components of FIG. 2;

DETAILED DESCRIPTION OF THE INVENTION

Figure 1:
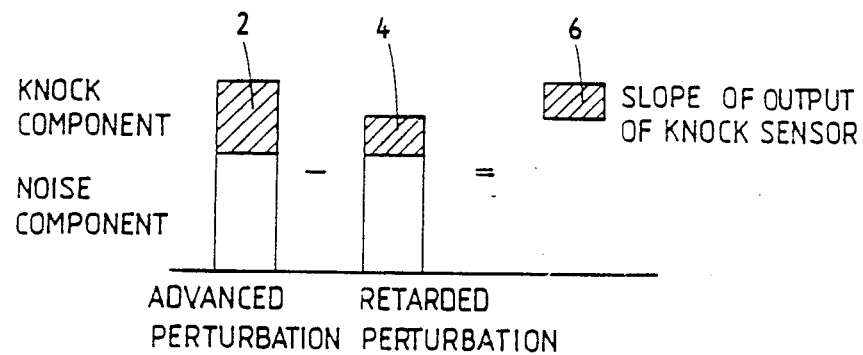
FIG. 1 illustrates the concept underlying the present invention.

Referring now more particularly to the drawings wherein like reference numerals represent like elements, FIG. 1 illustrates the principle behind the present invention with reference to a spark ignition engine. A base value is established for the spark advance angle, and the spark advance angle is perturbed about this base value to provide advanced and retarded perturbations in alternate engine cycles. The output of a knock sensor is examined during each perturbation. The output of the knock sensor in a pair of advanced and retarded perturbations is indicated respectively by bars 2 and 4 in FIG. 1. In each bar, the part which corresponds to the knock signal is shaded and the unshaded part corresponds to the noise component. By subtracting the output for the retarded perturbation from the output for the advanced perturbation, there is obtained a component 6 which represents the slope or differential of the output function of the knock sensor. When knock is not present, component 6 will be zero, and during knock conditions, component 6 will indicate the amount of knock present. Thus, with the present invention, the noise component is eliminated without providing a noise threshold.

Figure 2:
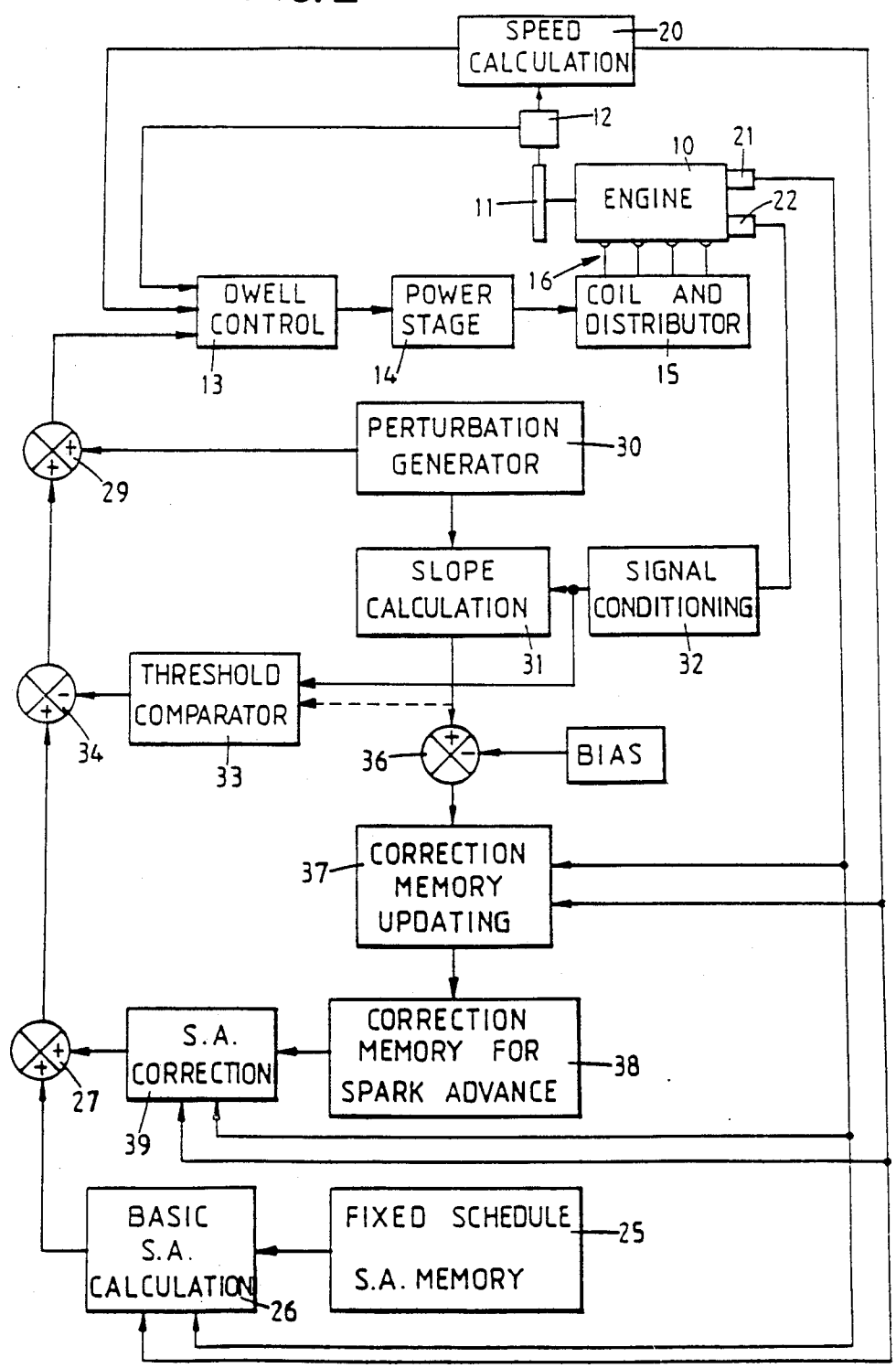
FIG. 2 is a diagram of the functional components of an adaptive control system embodying this invention.

Referring now to FIG. 2, there is shown a functional form of an adaptive control system embodying this invention and installed in a motor vehicle. The control system comprises a four cylinder spark ignition internal combustion engine 10 having a flywheel 11.

Flywheel 11 is associated with a position transducer 12 which produces a reference pulse for each 180° of rotation of the engine crankshaft. Each pulse is produced when the piston in the cylinder executing an expansion stroke is at 30° after the top dead center position. The pulses from transducer 12 are supplied to a dwell control device 13, the output of which is connected through a power stage 14 to a coil and distributor 15. Coil and distributor 15 is connected to four ignition plugs 16 and causes ignition sparks to occur in these plugs at appropriate moments.

The output of transducer 12 is also supplied to a speed calculation device 20 which calculates engine speed and supplies this to dwell control device 13. The engine is also provided with a transducer 21 which measures the load demand to which the engine is subjected. In the present example, transducer 21 measures the vacuum in the inlet manifold for the engine cylinders. The load demand could also be detected by measuring other quantities such as the throttle valve opening position or the rate of air flow into the inlet manifold.

Engine 10 is also provided with a knock sensor 22. In the present example, the knock sensor is a piezo-electric transducer mounted on the cylinder block to detect vibrations. The knock sensor could take other forms and could, for example, be a pressure sensor mounted in an engine cylinder.

The system also includes a memory 25 in which is stored a two dimensional array of spark advance angles, the abscissa and ordinate of the array corresponding respectively to engine speed and load demand. Memory 25, speed calculation device 20, and load demand sensor 21 are connected to a calculation device 26. For each prevailing engine speed and load demand, calculation device 26 calculates a basic value for spark advance and supplies this to one input of a summer 27. Calculation device 26 calculates this basic value from the spark advance values stored in the array in memory 25 at the four points in the speed/load plane surrounding the prevailing engine speed and load demand. Each of these values is multiplied by an appropriate weighting factor and the four resulting values are added to provide the basic spark advance value. Thus, the calculation device 26 calculates the basic spark advance angle by interpolation. A preferred embodiment of an interpolation method is described in detail in U.S. Ser. No. 016,790 filed Feb. 20, 1987, still pending and Ser. No. 888,067 filed July 22, 1986, still pending both of which are herein incorporated by reference. The spark advance values are stored in memory 25 at a density which provides a good match for irregularities of a true optimum spark advance characteristic of engine 10.

The spark advance values stored in memory 25 take the form of a fixed schedule which is established from rig-tests and sample engines. In such a fixed schedule, each spark advance value is normally the value at which maximum engine output is obtained with the avoidance of knock or is slightly retarded from the values at which knock will occur. As explained above, the spark advance angles at which knock occurs vary considerably between engines. If such fixed values are used without correction, there is a risk that knock will occur in some engines. In order to overcome this risk, in the present control system, knock is measured using the principles described with reference to FIG. 1. The results of these measurements are used both to retard the ignition timing angle when knock exceeds a threshold and to update a correction memory 38 for the spark advance values.

The system includes a perturbation generator 30 which generates perturbation values for the spark advance angle for each cylinder. In the present example, these perturbation values are alternately +2.5° and −2.5° of crankshaft rotation and the value is changed after each ignition spark. These perturbation values are supplied to an input of a summer 29, the output of which is connected to an input of dwell control device 13 as a command value for the spark advance angle. Dwell control device 13 uses the output of speed calculation device 20 and position transducer 12 to ensure that ignition sparks occur at the commanded advance values.

The perturbation values from generator 30 are supplied to a slope calculation device 31. Also, the output of knock sensor 22 is supplied via a signal conditioning circuit 32 to slope calculation device 31. Slope calculation device 31 calculates the gradient or slope or differential of the output of knock sensor 22 with respect to the spark advance angle.

Signal conditioning circuit 32 supplies a knock signal value to a threshold comparator 33, which provides output values to a negative input of summer 34. The output of summer 34 is connected to a second input of summer 29. When the knock signal value is less than the threshold value, the output value of comparator 33 is zero. When the knock signal value is greater than the threshold value, the output value of comparator 33 is set to 5° thereby causing a 5° retardation in the spark advance angle. This acts as a fast correction when large levels of knock are present. Such large knock levels may occur during transients.

Alternatively, this fast correction could also be achieved by using the output from the slope calculation device 31 supplying a slope signal value to the threshold comparator 33. The system will operate in similar manner but the slope value will now be compared with the threshold value.

The slope values are also supplied to an input of a summer 36, a negative input of which receives a bias value for a reason which will be described below. The output of summer 36 is supplied to a device 37 for updating memory 38 in which are stored correction values for spark advance angle. The correction values are stored as a two dimensional array in which the abscissa and ordinate respectively represent engine speed and load demand, and they are stored with the same density as the values in memory 25.

Correction memory updating device 37 also receives the outputs of speed calculation device 20 and load demand sensor 21. Device 37 updates the values stored in memory 38 for each of the four array points surrounding the prevailing engine speed and load demand. Specifically, for each array point, a new correction is calculated and stored from the old correction in accordance with the following formula:

new correction=old correction+$K$×(weighting factor)×(SLOPE−BIAS)

where K is a constant, SLOPE is the output value produced by device 31, and BIAS is the bias value supplied to the negative input of summer 36. The weighting factors used in the above formula are the same as the weighting factors used by device 26 and by a device 39 for calculating spark advance correction values. The method of calculating the weighting factors will be described below. The above formula is that of a discrete time integrator. When this is applied to the output of slope calculator 31, the integration will increase the signal-to-noise ratio because the noise has zero means level. By simply changing the integration constant K, the signal-to-noise ratio can be improved to any desired value. Prior art systems do not have noise with zero mean level. As a result, if integration is applied, the noise is increased in the same proportion as the signal, and the signal-to-noise ratio is unchanged.

Device 39 for calculating spark advance correction values is also responsive to the outputs of the speed calculation device 20 and load demand sensor 21 and can retrieve values from memory 38.

For prevailing engine conditions, device 39 calculates a correction value and supplies this to a positive input of summer 27. This correction value is used only if it is negative, corresponding to a retard of spark angle. Thus, no correction is made at low knock levels and the system allows a small amount of knock to be present before any corrective action is taken. This small level of knock can improve fuel economy. Because the correction value is used only when it is negative, any residual noise which may be present in the values calculated by device 31 does not cause corrective action.

The output of summer 27 is connected to an input of summer 34. Device 39 calculates the correction values by using the same interpolation method as that used by device 26. It is to be noted that the interpolation process used to calculate the spark advance angles by devices 26 and 39 is symmetrical with the interpolation process used to update memory 38.

The various functional blocks shown in FIG. 2 are implemented by using a microcomputer system shown in FIG. 3. As shown in FIG. 3, the microcomputer system comprises an Intel Corporation (3065 Bowers Avenue, Santa Clara, California 95051) 8097 microcomputer 50 which is connected via a data and address bus 51 to a type 27C64 read only memory 52, a Hitachi (50 Prospect Avenue, Terrytown, New Jersey 10591–4698) type 6116 read/write memory 53, and a Greenwich Instruments Limited (Sidecup, Kent, England) type NVR2 non-volatile read/write memory 54. The program and fixed schedules are stored in memory 52, temporary variables are stored in memory 53, and the corrections for the spark advance angle are stored in memory 54.

Referring to the functional components of FIG. 2, the microcomputer system implements speed calculation device 20, memories 25 and 38, spark advance calculation devices 26 and 39, summers 27, 29, 34 and 36, perturbation generator 30, slope calculation device 31, threshold comparator 33, and correction memory updating device 37.

Referring again to FIG. 3, load demand transducer 21 is connected through a conventional signal conditioning circuit 55 to an ANALOG input of microcomputer 50. Position transducer 12 is of the variable reluctance type and coacts with a toothed wheel secured to flywheel 11 (FIG. 2). A tooth has been removed from this toothed wheel to establish the required reference position. Transducer 12 is connected through a signal conditioning circuit 56 to a HIGH SPEED input of microcomputer 50.

Figure 4:
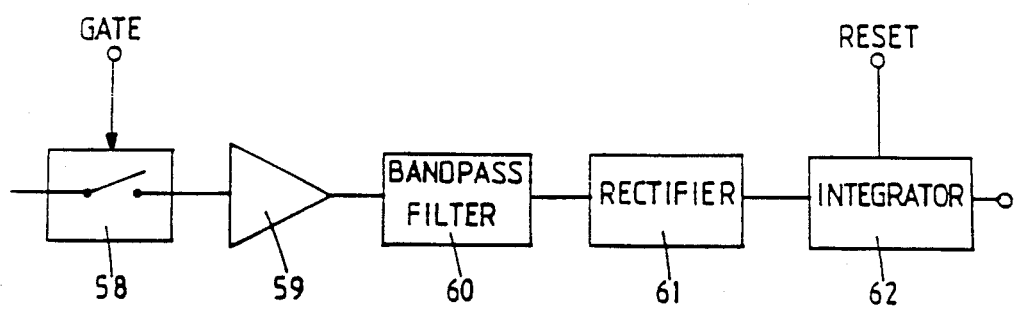
FIG. 4 is a circuit diagram of a signal conditioning circuit forming part of the microcomputer system of FIG. 3.

Knock sensor 22 is connected through a signal conditioning circuit 57 to a further ANALOG input of microcomputer 50. The signal conditioning circuit 57 is shown in more detail in FIG. 4 and comprises, in series, a switch 58, an amplifier 59, a bandpass filter 60, a rectifier circuit 61 and an integrator 62. The control terminals of switch 58 and integrator 62 are connected to HIGH SPEED outputs of microcomputer 50. The microcomputer system is arranged so that switch 58 is closed for each ignition spark when the respective piston is 10° before the top dead center position and opened when the piston is at 40° after the top dead center position. Thus, switch 58 selects that part of the output signal of knock sensor 21 during which knock can occur. Integrator 62 is reset to zero output after the internal analog/digital converter of microcomputer 50 has read the integrated knock signal after each spark.

A HIGH SPEED output of microcomputer 50 is connected to the input of dwell control circuit 63. Dwell control circuit 63, together with part of the program stored in memory 52, performs the function of dwell control device 13 shown in FIG. 2. Dwell control circuit 63 is a type L497 dwell control circuit supplied by S.G.S. Limited. Dwell control circuit 63 initiates the buildup of current in the primary winding of the ignition coil at the correct moment to achieve the required level just before the current is interrupted. Dwell control circuit 63 also limits the coil current to the required level during the short period which elapses between achieving the required current level and the current being interrupted. The output of dwell control circuit 63 is connected to power stage 14 which, as mentioned with reference to FIG. 2, is connected at the input of coil and distributor 15.

Figure 8:
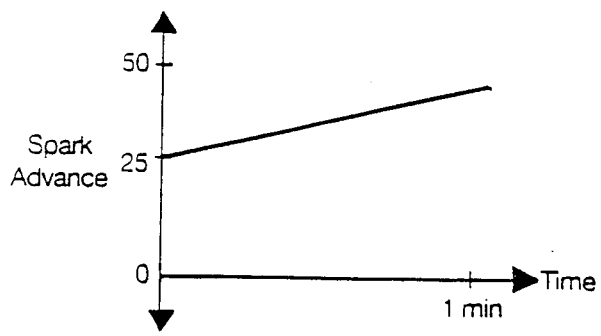
FIG. 8 illustrates a curve showing a steadily increasing spark advance angle.
Figure 9:
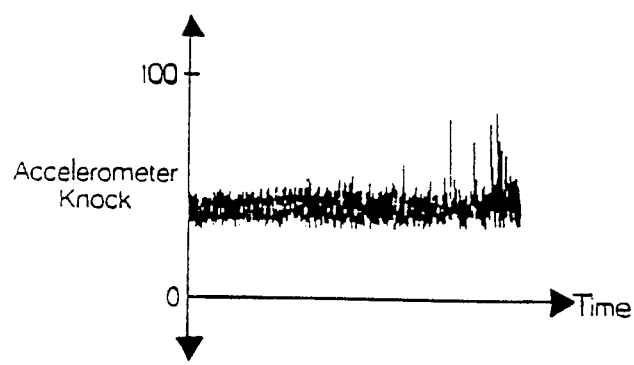
FIG. 9 shows the output signal of signal conditioner 32 of FIG. 2 under the conditions of steadily increasing spark advance angle with a common time axis as that of FIG. 8.
Figure 10:
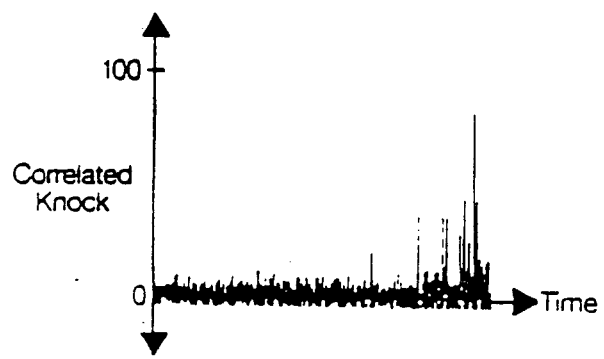
FIG. 10 shows the output of slope calculator 31 under the same conditions of steadily increasing spark advance angle with a common time axis as those of FIGS. 8 and 9.

FIG. 9 shows the output signal of signal conditioner 32 in FIG. 2 under the conditions of steadily increasing spark advance angle of FIG. 8. Knock is occurring to the right of the signal, but is masked by the high noise level. Prior art systems use similar signal processing as that of signal conditioner 32 and then attempt to distinguish between the knock signal and the noise by applying a detection threshold corresponding to the noise level. But due to the randomness and level of the noise, particularly at high engine speeds, the threshold either has to be conservative, in which case low levels of knock will not be detected, or if the threshold is lower, then false detection of knock will occur. FIG. 10 shows the output of slope calculator 31 under the same conditions as in FIGS. 8 and 9. The noise level is much smaller, and due to the correlation technique, has a mean level of zero.

Figure 5:
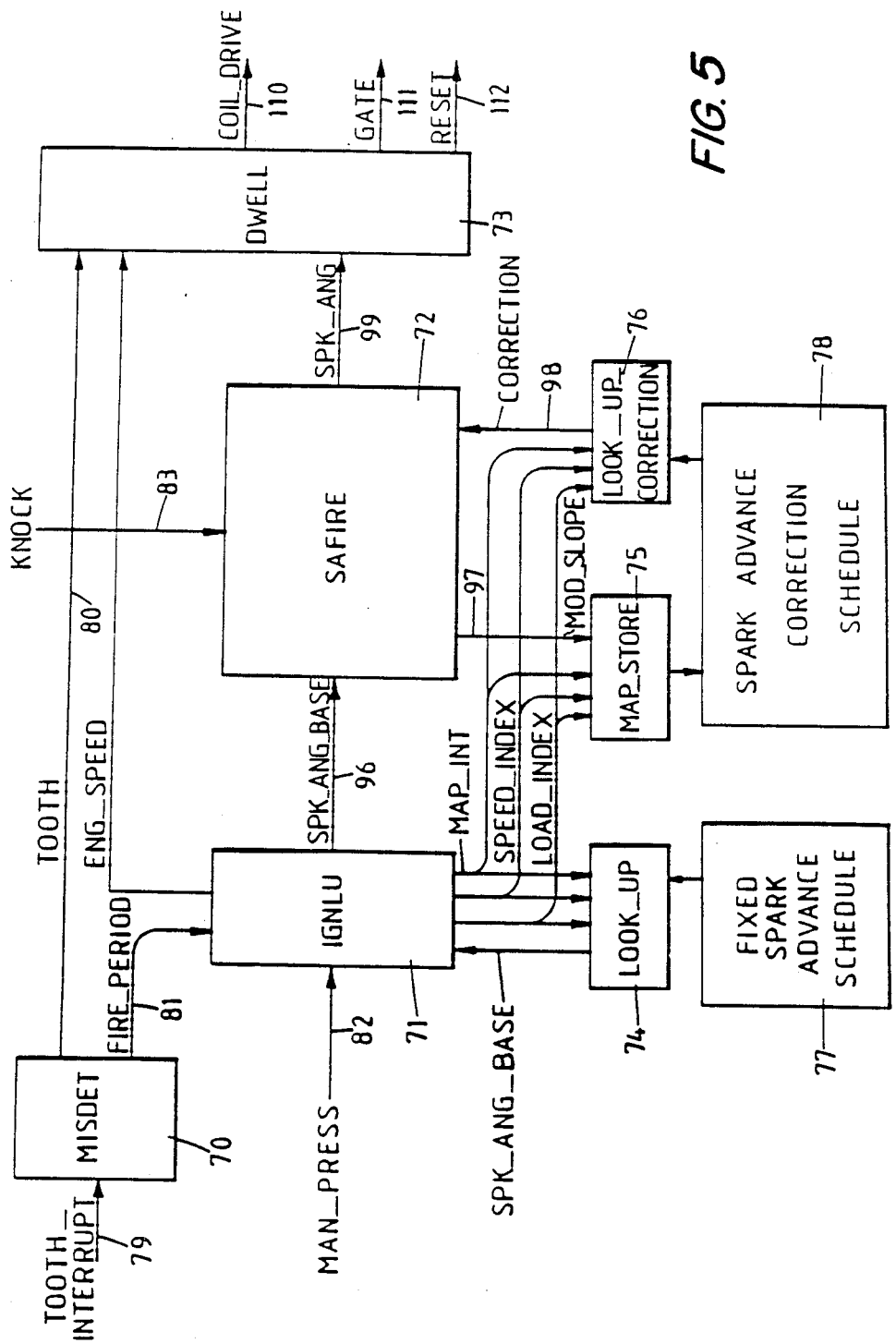
FIG. 5 is a layout diagram of a computer program used in the microcomputer system of FIG. 3.

Referring now to FIG. 5, there is shown the general arrangement of the modules which form the program and also the flow data between these modules. The program comprises modules MISDET 70, IGNLU 71, SAFIRE 72, and DWELL 73. The modules IGNLU calls a sub-module LOOK-UP 74 and the module SAFIRE calls sub-modules MAP-STORE 75 and LOOK-UP-CORRECTION 76. FIG. 5 also shows a spark advance schedule 77 which contains the fixed spark advance values and which correspond to memory 25 of FIG. 2. FIG. 5 further shows a spark advance correction schedule 78 which contains the correction values for spark advance and corresponds to memory 38 shown in FIG. 2.

The module MISDET receives an interrupt TOOTH-INTERRUPT (indicated by a line 79) and this module is executed each time a tooth is detected. A variable TOOTH is supplied to the module DWELL (indicated by a line 80) and this variable represents the position of the crankshaft to within one tooth of the transducer 12. This module MISDET compares the period between each tooth and thereby detects the missing tooth. When the missing tooth is detected, this module re-establishes the relationship between the variable TOOTH and the absolute position of the crankshaft. The module MISDET also calculates the fire period and supplies this as a variable FIRE-PERIOD (indicated by a line 81) to the module INGLU.

The module IGNLU receives a variable MAN-PRESS (indicated by a line 82) representing manifold pressure which is indicative of the load demand. The variable MAN-PRESS is derived from the output signal of transducer 21 by the internal analog/digital converter of microcomputer 50.

The module SAFIRE receives a variable KNOCK (indicated by a line 83). The variable KNOCK is indicative of the knock as sensed by sensor 22 after processing by signal conditioning circuit 57 and after analog/digital conversion by a further converter which also forms part of microcomputer 50.

In each of schedules 77 and 78, the spark advance values are stored as a 16×16 array. In each array, the abscissa and ordinate correspond respectively to engine speed and load demand and the abscissa and ordinate are divided respectively into 16 discrete engine speed and load demand values. Thus, each array point contains the spark advance value for one of the discrete engine speed values and one of the discrete load demand values.

In order to address schedules 77 and 78, the module IGNLU generates address variable SPEED-INDEX and LOAD-INDEX corresponding respectively to engine speed and load demand. Each of these address variables can assume any one of values 0 to 15 corresponding to 16 discrete engine speed and load demand values. These variables are set to values corresponding to the engine speed and load demand immediately below the prevailing speed and load demand. The address variables SPEED-INDEX and LOAD-INDEX are supplied to the sub-modules LOOK-UP, MAP-STORE and LOOK-UP-CORRECTION.

The module IGNLU also calculates four variables MAP-INT 0 to 3 which represents the four weighting factors described above. The variable MAP-INT 0 to 3 are supplied to the sub-module LOOK-UP, MAP-STORE, and LOOK-UP-CORRECTION. The four variables MAP-INT 0 to 3 correspond respectively to the four addresses (SPEED-INDEX, LOAD-INDEX), (SPEED-INDEX+1, LOAD-INDEX), (SPEED-INDEX, LOAD-INDEX+1), and (SPEED-INDEX+1, LOAD-INDEX+1).

Figure 6:
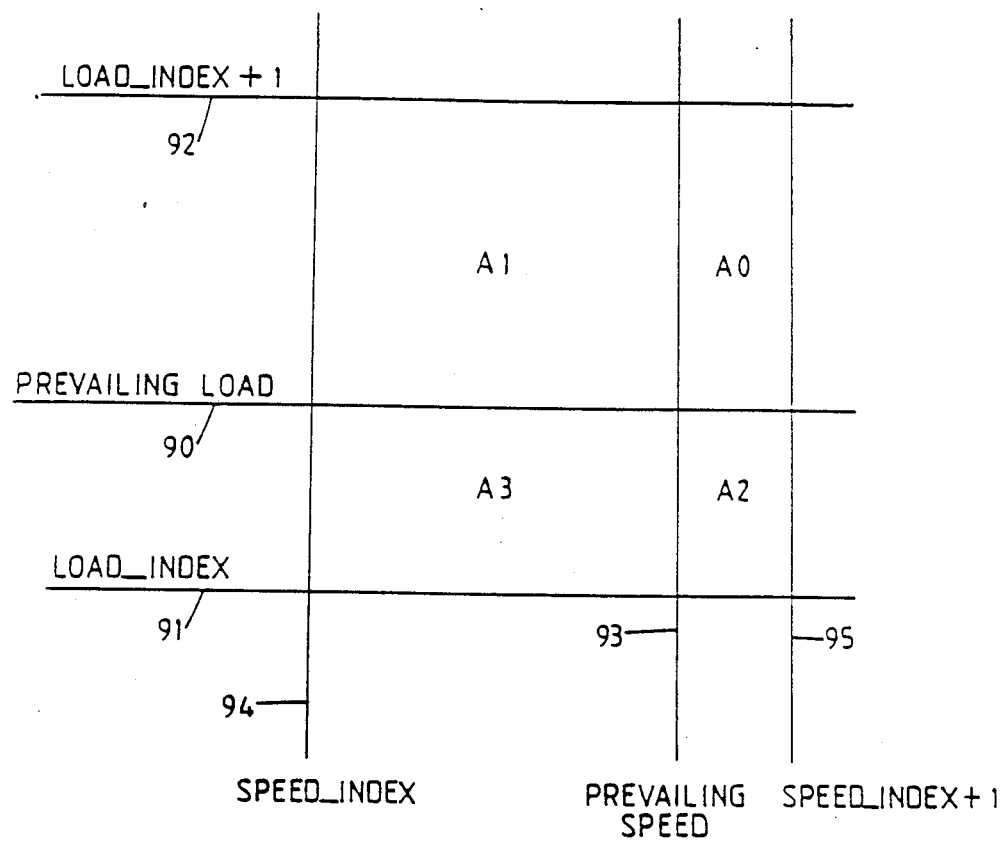
FIG. 6 is a diagram illustrating the calculation of weighting functions used in the computer program.

The method of calculating the weighting factors MAP-INT 0 to 3 for the prevailing speed and load is shown in FIG. 6. A main rectangle is formed in the speed/load plane, the corners of the rectangle lying at the addresses (SPEED-INDEX, LOAD-INDEX), (SPEED-INDEX+1, LOAD-INDEX), (SPEED-INDEX, LOAD-INDEX+1), (SPEED-INDEX+1, LOAD INDEX+1). This main rectangle is divided into four sub-rectangles by drawing lines parallel to the abscissa and ordinate passing through the prevailing speed and load demand, these sub-rectangles having areas A0, A1, A2, A3. In FIG. 6, line 90 indicates the prevailing load, and lines 91 and 92 respectively indicate LOAD-INDEX and LOAD-INDEX+1. Line 93 indicates the prevailing engine speed and lines 94 and 95 respectively indicate SPEED-INDEX and SPEED-INDEX+1. The weighting factor for each of the four array points is calculated by dividing the area of the sub-rectangle diagonally opposite the array point by the area of the main rectangle. Thus, the weighting factors $MAP\text{-}INT$ 0 to 3 have the following values:

$MAP\text{-}INT\ 0 = A0/A$ $MAP\text{-}INT\ 1 = A1/A$ $MAP\text{-}INT\ 2 = A2/A$ $MAP\text{-}INT\ 3 = A3/A$ where $A = A0 + A1 + A2 + A3$.

The module IGNLU calls the sub-module LOOK-UP which calculates the basic spark advance angle as a variable SPK-ANG-BASE by the interpolation process which has been described above. The module IGNLU then supplies the variable SPK-ANG-BASE to the module SAFIRE as indicated by line 96.

The module IGNLU is executed after each ignition spark and the module SAFIRE is executed after module IGNLU.

Figure 7A:
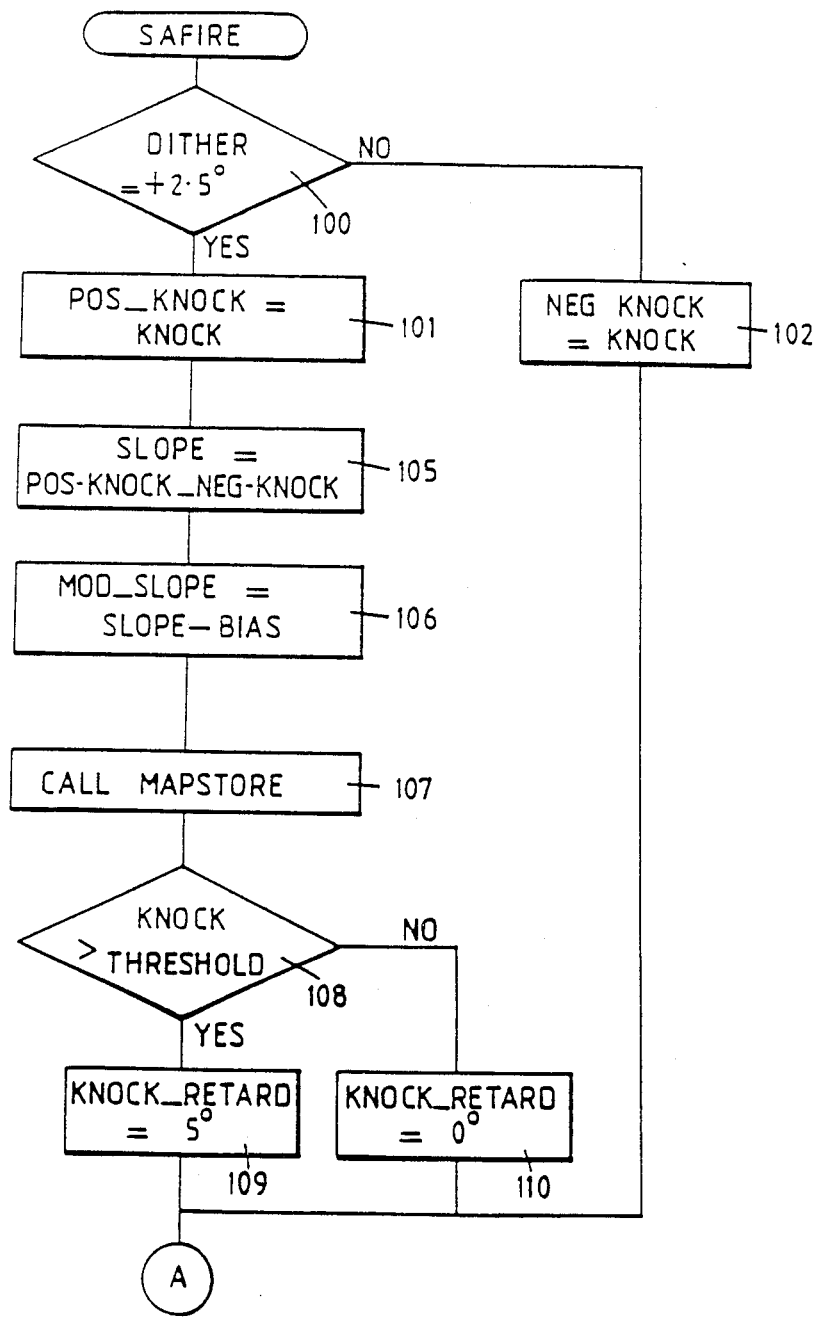
FIGS. 7a and 7b represent flow charts of portions of the computer program.
Figure 7B:
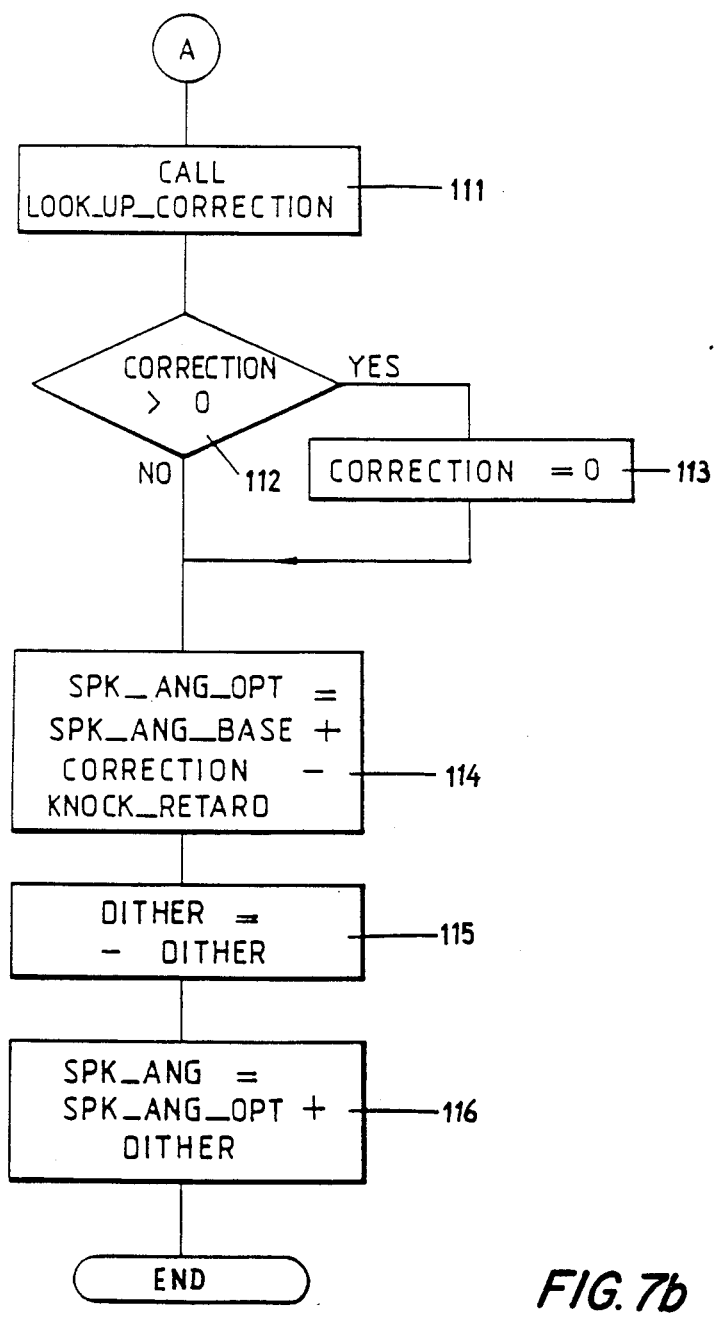

The module SAFIRE calculates the perturbation values to the spark advance angle, and calculates the slope of the knock (as sensed by knock sensor 22 and processed by signal conditioning circuit 57) with respect to spark advance angle. This module uses the calculated slope to update the spark advance correction schedule 78 and also retrieves a correction value to the spark advance from the schedule 78. This module also sums the basic spark advance value SPK-ANG-BASE with the perturbation value and the calculated correction value to produce a spark advance command value SPK-ANG and this value is supplied to the module DWELL. The module SAFIRE will now be described with reference to the flow chart shown in FIGS. 7a and 7b.

After entering the module SAFIRE, in a step 100, a variable DITHER is examined. This variable represents the present perturbation value. If DITHER equals +2.5°, the program continues with a step 101 but otherwise continues with a step 102. In step 102, a variable NEG-KNOCK is set to the present value of the variable KNOCK and the program then jumps to a step 111. In step 101, a variable POS-KNOCK is set to the present value of variable KNOCK and the program continues with a step 105.

In step 105, a variable SLOPE, which represents the slope of the knock with reference to the spark advance angle, is calculated in accordance with the following equation:

$SLOPE = POS\text{-}KNOCK - NEG\text{-}KNOCK$

Next, in a step 106, a variable MOD-SLOPE, which represents the amount by which the knock exceeds the acceptable level, is calculated in accordance with the following equation:

$MOD\text{-}SLOPE = SLOPE - BIAS.$

The variable MOD-SLOPE is supplied by module SAFIRE to the sub-module MAP-STORE as indicated by line 97. The constant BIAS is the bias value mentioned with reference to summer 36 in FIG. 2.

The sub-module MAP-STORE then uses the value of MOD-SLOPE together with the values of MAP-INT 0 to 3, SPEED-INDEX and LOAD-INDEX, to update spark advance correction schedule 78. This is performed in a manner already described with reference to FIG. 2.

Next, in a step 108, the variable KNOCK is compared with a constant THRESHOLD, which represents the knock level at which an immediate retardation of spark advance angle is required. If KNOCK is greater than THRESHOLD, a variable KNOCK RETARD is set to a value corresponding to 5° of crankshaft rotation in a step 109. Otherwise, the variable KNOCK-RETARD is set to zero in a step 110. The program then continues with step 111. It should be noted that with respect to the alternative embodiment discussed above which is also particularly suited for fast correction when large levels of knock are present, in step 108 the variable SLOPE (rather than KNOCK) is compared with a constant THRESHOLD, and if SLOPE is greater than THRESHOLD, the further steps described above are implemented.

In step 111, the sub-module LOOK-UP-CORRECTION is called. This sub-module calculates a variable CORRECTION, which represents the appropriate correction to the spark advance angle for the present engine load and engine speed. This variable is supplied to the module SAFIRE as indicated by line 98. This variable is calculated by the interpolation method described with reference to FIG. 2.

CORRECTION can be positive indicating that the maximum allowable knock level has not been reached. In this case, it is not desirable to advance the spark angle. In steps 112 and 113, CORRECTION is examined and, if it is positive, it is set to zero.

Next, in a step 114, a variable SPK-ANG-OPT is calculated in accordance with the following equation:

$$SPK\text{-}ANG\text{-}OPT = SPK\text{-}ANG\text{-}BASE + CORRECTION - KNOCK\text{-}RETARD$$

Thus, the variable SPK-ANG-OPT represents the spark advance angle modified in accordance with the correction value stored in schedule 78 and adjusted to take account of any retardation which is necessary when an excessive knock level is detected. The program then continues with a step 115.

In step 115, the variable DITHER is set to −DITHER. Thus, the variable DITHER always has a magnitude of 2.5° and its polarity is reversed after each ignition spark. This ensures that the spark advance value is alternately retarded and advanced by 2.5°.

In step 116, the variable SPK-ANG, which represents the commanded spark advance value, is set in accordance with the following equation:

$$SPK\text{-}ANG = SPK\text{-}ANG\text{-}OPT + DITHER$$

The variable SPK-ANG is supplied to the module DWELL as indicated by line 99. The sub-module SAFIRE then ends.

Returning to FIG. 5, the routine DWELL uses the variables TOOTH, ENG-SPEED, and SPK-ANG to calculate a variable COIL-DRIVE (indicated by line 110) which controls the generation of each spark. Specifically, COIL-DRIVE causes the HIGH SPEED output of microcomputer 50 to go low when the engine crankshaft passes the commanded spark advance position and to go high early enough to allow the primary current in the ignition coil to reach the required value.

The routine DWELL also calculates a variable GATE (indicated by line 111) which causes the HIGH SPEED output of microcomputer 50, which is connected to signal conditioning circuit 57, to go high and low in order to control switch 58.

The routine DWELL also calculates a variable RESET (indicated by line 112) which causes the HIGH SPEED output of microcomputer 50, which is also connected to signal conditioning circuit 57, to go high and low in order to reset integrator 62.

The graphs of FIGS. 9 and 10 illustrate the effects of steadily increasing spark advance angle as shown in FIG. 8 at an engine speed of 4000 r.p.m. on a typical sample engine. FIG. 9 shows the output signal of signal conditioning circuit 32 in FIG. 2. Although knock is occurring to the right of this graph, it is largely masked by the high noise level. Previously known systems for detecting knock use similar signal processing techniques as that used in signal conditioning circuit 32, but attempt to distinguish between the knock signal and the noise by applying a detection threshold corresponding to the noise level. However, because of the randomness and level of the noise, particularly at high engine speeds, the threshold must either be conservative, in which case low levels of knock are not detected, or be relatively low, in which case false detection of knock occurs.

FIG. 10 shows the output signal of slope calculation circuit 31 for the same conditions of steadily increasing spark advance. The noise level of this signal is much smaller and, because of the correlation technique provided by slope calculation circuit 31, has a mean level of zero. Equation 1 given hereinbefore for finding the new correction in correction memory updating device 37 is that of a discrete time integrator. As applied to the output of slope calculation circuit 31 (including the effect of summer 36 and the BIAS), the resulting integration increases the signal-to-noise ratio because the noise has zero mean level. By changing the integration constant K, the signal to noise ratio can be improved to any desired value.

Previously known systems do not have noise with zero means level. Thus, if integration were to be applied in such cases, the noise would be increased in the same proportion as the signal and the signal-to-noise ratio would remain unchanged.

In the example of the present invention which has been described above, the spark advance angle is perturbed by being alternately advanced and retarded after each ignition spark. By way of modification, the spark advance angle may be perturbed by being alternately advanced and retarded after each complete engine cycle. Thus, with a four stroke engine, each ignition cycle would include four ignition sparks. With this modification, the variable SLOPE would be calculated from the values of KNOCK for two succeeding engine cycles. By way of another modification, the spark advance angles may be set for each individual cylinder. In this case, the variable SLOPE will be calculated for each cylinder from values of the variable KNOCK in successive engine cycles.

In the above example, a control input in the form of a spark advance angle is perturbed in order to measure KNOCK and this same control input is then adjusted to eliminate knock. However, the present invention is not limited to using this particular control input and, moreover, the present invention is not limited to using the same control input both for the perturbations to measure knock and for the adjustment to eliminate knock. The present invention can also be applied to a diesel engine. Examples of the control inputs which can be used for the perturbations to measure knock and the adjustment to eliminate knock include, apart from spark advance angle, timing of fuel injection in either gasoline or diesel engines, air/fuel ratio in either gasoline or diesel engines, and exhaust gas/air ratio in engines in which exhaust gases are mixed with the engine intake air.

The system described above may be combined with an adaptive control system in which spark advance angle is corrected to achieve optimum engine output. An example of such an adaptive control system is described in U.S. patent application Ser. No. 016,790, still pending noted earlier, which is incorporated herein by reference.

In such a combination, perturbation generator 30 would be common to both systems and, as specified in said patent application Ser. No. 016,790, it would maintain the perturbations at a frequency slightly higher than the resonance of the vehicle driveline.

The correction value to spark advance to achieve optimum output would be compared with the correction value required to control knock and the lower value would be supplied to summer 27. Thus, the value which causes the most retardation (or least advance) would be used.

Figure 11:
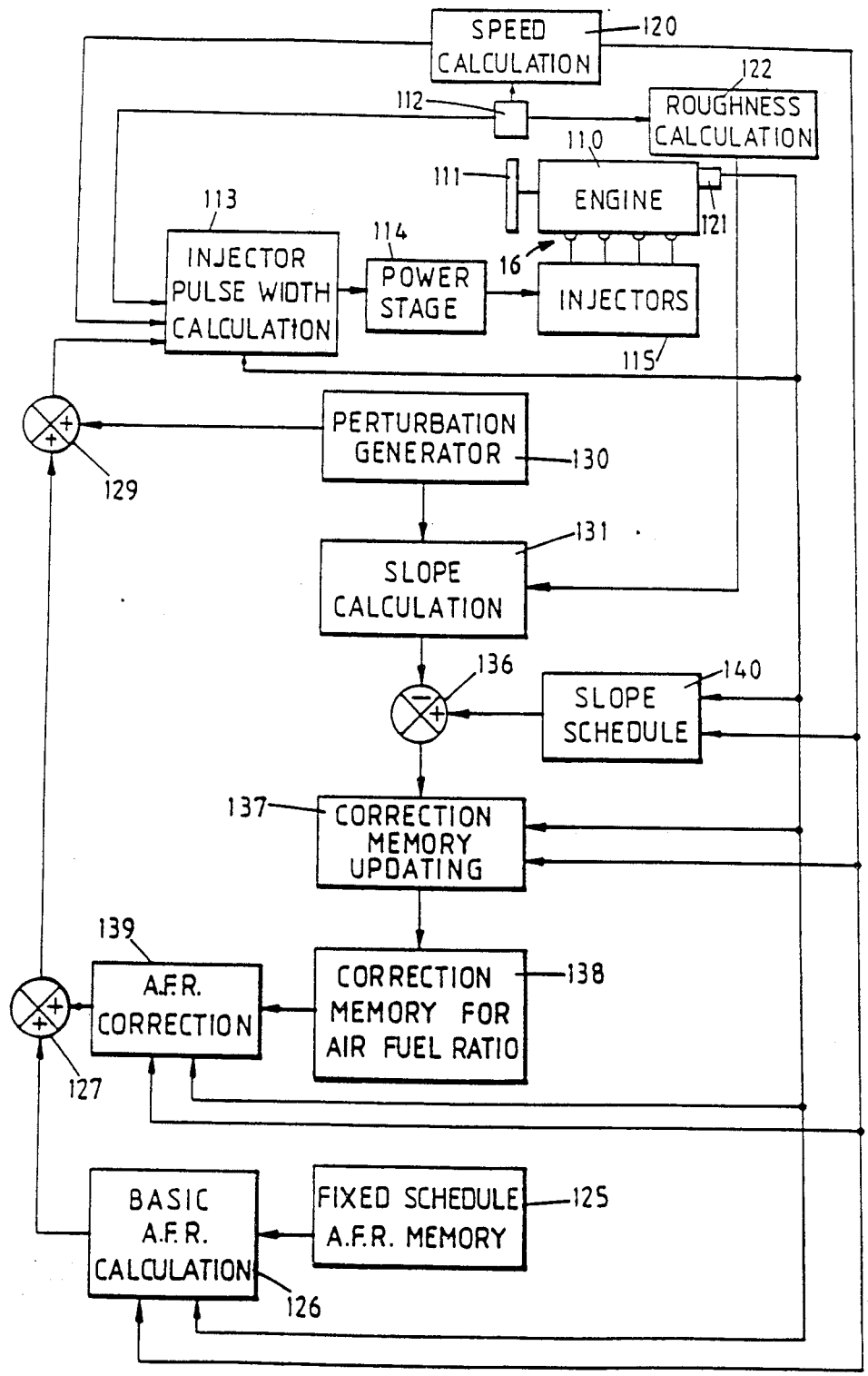
FIG. 11 is a diagram of the functional components of another embodiment of an adaptive control system according to the invention.

The present invention may also be applied to measurement of engine roughness. FIG. 11 is a diagram showing the functional components of another embodiment of an adaptive control system according to the present invention and installed in a motor vehicle, wherein the engine parameter representing combustion quality is engine roughness and a sensor is employed for sensing the engine roughness. Measurement of engine roughness is discussed in SAE paper 860413, entitled "Lean Limit A/F Control System by Using Engine Speed Variation," which is incorporated by reference herein. As explained in this paper, measurement of engine roughness also suffers from the problem of identifying background noise. In the case of engine roughness, the background noise is caused by road irregularities. When using the present invention to measure engine roughness, the perturbed parameter would be air/fuel ratio. As an engine approaches the lean limit of combustion, engine roughness varies considerably with air/fuel ratio.

Referring now to FIG. 11, there is shown a functional form of an adaptive control system embodying this invention and installed in a motor vehicle. The control system is applied to a four cylinder spark ignition or compression ignition (diesel) internal combustion engine 110 having a flywheel 111. The system bears a substantial resemblance to the system shown in FIG. 2, and corresponding parts or parts performing a similar function to those in FIG. 2 are indicated by the same reference numerals increased by 100.

The flywheel 111 is associated with a position transducer 112 which produces a reference pulse for each 180° of rotation of the engine crankshaft. Each pulse is produced when the piston in the cylinder executing an expansion stroke is at a predetermined angle after the top dead center position. The pulses from transducer 112 are supplied to an injector pulse width calculation device 113, the output of which is connected through a power stage 114 to injectors 115 of a fuel injection system of engine 110 so as to control the duration of injection of fuel into the inlet manifold or cylinder.

The output of transducer 112 is also supplied to a speed calculation device 120 which calculates engine speed and supplies this to calculation device 113. The engine is also provided with a transducer 121 which measures the load demand to which the engine is subjected. In the present example, transducer 121 measures the depression in the inlet manifold for the engine cylinders. The load demand could also be detected by measuring other quantities such as the throttle valve opening position or the rate of air flow into the inlet manifold.

The output of transducer 112 is also connected to a roughness calculation circuit 122 which calculates the engine roughness from variations in engine speed.

A suitable formula for calculating roughness is described in SAE paper 860413. The simplified formula used here is $$\text{ROUGHNESS} = \frac{K \times (T_1 - 2 T_2 + T_3)}{(T_1 + T_2 + T_3)^3}$$

where $T_1$, $T_2$, $T_3$ are the periods for three successive complete engine cycles and K is a constant.

The system also includes a memory 125 in which is stored a two dimensional array of air/fuel ratio values, the abscissa and ordinate of the array corresponding to engine speed and load demand. Memory 125, speed calculation device 120, and load demand sensor 121 are connected to a calculation device 126. For each prevailing engine speed and load demand, calculation device 126 calculates a basic value for air/fuel ratio and supplies this to one input of a summer 127. Calculation device 126 calculates this basic value from the air/fuel ratio values stored in the array in memory 125 at the four points in the speed/load plane surrounding the prevailing engine speed and load demand. Each of these values is multiplied by an appropriate weighting factor and the four resulting values are added to provide the basic air/fuel ratio. Thus, calculation device 126 calculates the basic air/fuel ratio by interpolation. The air/fuel ratio values are stored in memory 125 at a density which provides a good match for irregularities of a true optimum air/fuel ratio characteristic of engine 110. The interpolation technique performed by calculation device 126 corresponds to that performed by device 26 of FIG. 2 and described in more detail hereinbefore with reference to FIG. 6.

The air/fuel ratio values stored in memory 125 take the form of a fixed schedule which is established from rig-tests and sample engines. In such a fixed schedule, each value is normally that at which minimum fuel consumption or minimum engine emissions is or are obtained, and these values are usually on the rich side of the values at which engine roughness will occur. The air/fuel ratios at which engine roughness occurs vary considerably between engines and for any particular engine the desired AFR is not always obtained because of drift and tolerances in the fuelling system components. If such fixed values are used without correction, there is a risk that roughness or excessive fuel consumption or emissions will occur in some engines. In order to overcome this risk, in the present control system, engine roughness is measured and used to correct the air/fuel ratio when engine roughness differs from a desired value and to update a correction memory 138 for the air/fuel ratio values.

The system includes a perturbation generator 130 which generates perturbation values for the AFR for each cylinder. In the present example, these perturbation values are alternatively ±0.5 AFR and the value is changed after a predetermined time period of 1 sec. in the particular example. These perturbation values are supplied to an input of a summer 129, the output of which is connected to an input of injector pulse width calculation device 113 as a command value for AFR. Device 113 uses the output of speed calculation device 120, position transducer 112 and load transducer 121 to ensure that fuel injection begins at the correct crankshaft position and that the duration of fuel injection produces the commanded AFR.

The perturbation values from perturbation generator 130 are also supplied to a slope calculation device 131. Also, the output of roughness calculation circuit 122 is supplied to slope calculation device 131. Slope calculation device 131 calculates the gradient or slope of the output of roughness calculation circuit 122 with respect to air/fuel ratio. The slope values are supplied to a negative input of a summer 136, whose positive input is connected to the output of a slope schedule device 140. Slope schedule device 140 receives the outputs of speed calculation device 120 and load demand sensor 121 and stores a schedule of slopes corresponding to minimum fuel consumption or minimum emissions. The output of the summer is supplied to a device 137 for updating memory 138 in which are stored correction values for the air/fuel ratio. The correction values are stored as a two dimensional array in which the abscissa and ordinate represent engine speed and load demand and they are stored with the same density as the values in memory 125.

Correction memory updating device 137 also receives the outputs of speed calculation device 120 and load demand sensor 121. Device 137 updates the values stored in memory 138 for each of the four array points surrounding the prevailing engine speed and load demand. Specifically, for each array point, a new correction is calculated and stored from the old correction in accordance with the following formula:

new correction=old correction +K×(weighting factor)×(SCHEDULED SLOPE−CALCULATED SLOPE)

where K is a constant, CALCULATED SLOPE is the output value produced by device 131, and SCHEDULED SLOPE is the value supplied by slope schedule device 140. The weighting factors used in this formula are the same as those used by device 126 and by a device 139 for calculating air/fuel ratio correction values. This has been described hereinbefore, for instance with reference to devices 26 and 39 of FIG. 2, and will not therefore be described further.

Device 139 for calculating air/fuel ratio correction values is also responsive to the outputs of speed calculation device 120 and load demand sensor 121 and can retrieve the values from memory 138.

For prevailing engine conditions, device 139 calculates a correction value and supplies this to a positive input of summer 127.

The output of summer 127 is connected to an input of summer 129. Device 139 calculates the correction values by using the same interpolation method as that used by device 126.

It is to be noted that the interpolation process used to calculate the air/fuel ratio values by devices 126 and 139 is symmetrical with the interpolation process used to update memory 138.

The various functional blocks shown in FIG. 11 may be implemented in substantially the same way as the functional blocks shown in FIG. 2 as described hereinbefore with reference to FIGS. 3, 5 and 7. This is well within the capabilities of one of ordinary skill in the art, and will not therefore be described further.

Figure 12:
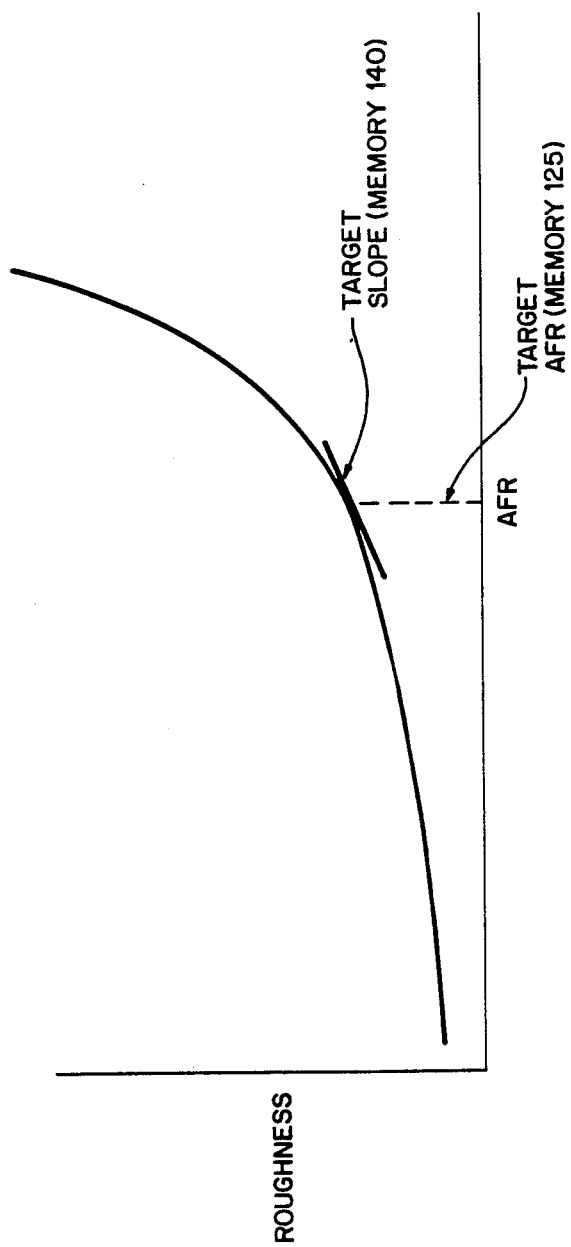
FIG. 12 illustrates examples of target slopes contained in slope schedule 140.

It should be noted that exactly the same arrangement is used for measuring roughness as is employed for measuring speed, in terms of the provision of a single pulse per revolution of the crank shaft. Slope schedule 140 contains target slope values corresponding to the desired air-to-fuel ratio (to minimize fuel consumption and/or emissions). Target slope values are always non-zero. FIG. 12 is a graph representing target slopes.

The invention also provides a system in which spark advance and air/fuel ratio are perturbed alternately. In such a system, the perturbation in spark advance would be used to control spark advance so as to maximize torque and to control knock. The perturbation in air/fuel ratio would be used to control air/fuel ratio to the lean limit as determined by the roughness slope measurement in order to minimize fuel consumption and reduce emissions.

Under certain conditions, such as high load, it is necessary to maximize the power output of the engine rather than minimize the fuel consumption. Under such conditions, the perturbations of air/fuel ratio could be used to detect the slope of engine output against air/fuel ratio and maximize engine output in a manner analagous to that described in said U.S. patent application Ser. No. 016,790, still pending.

Figure 13:
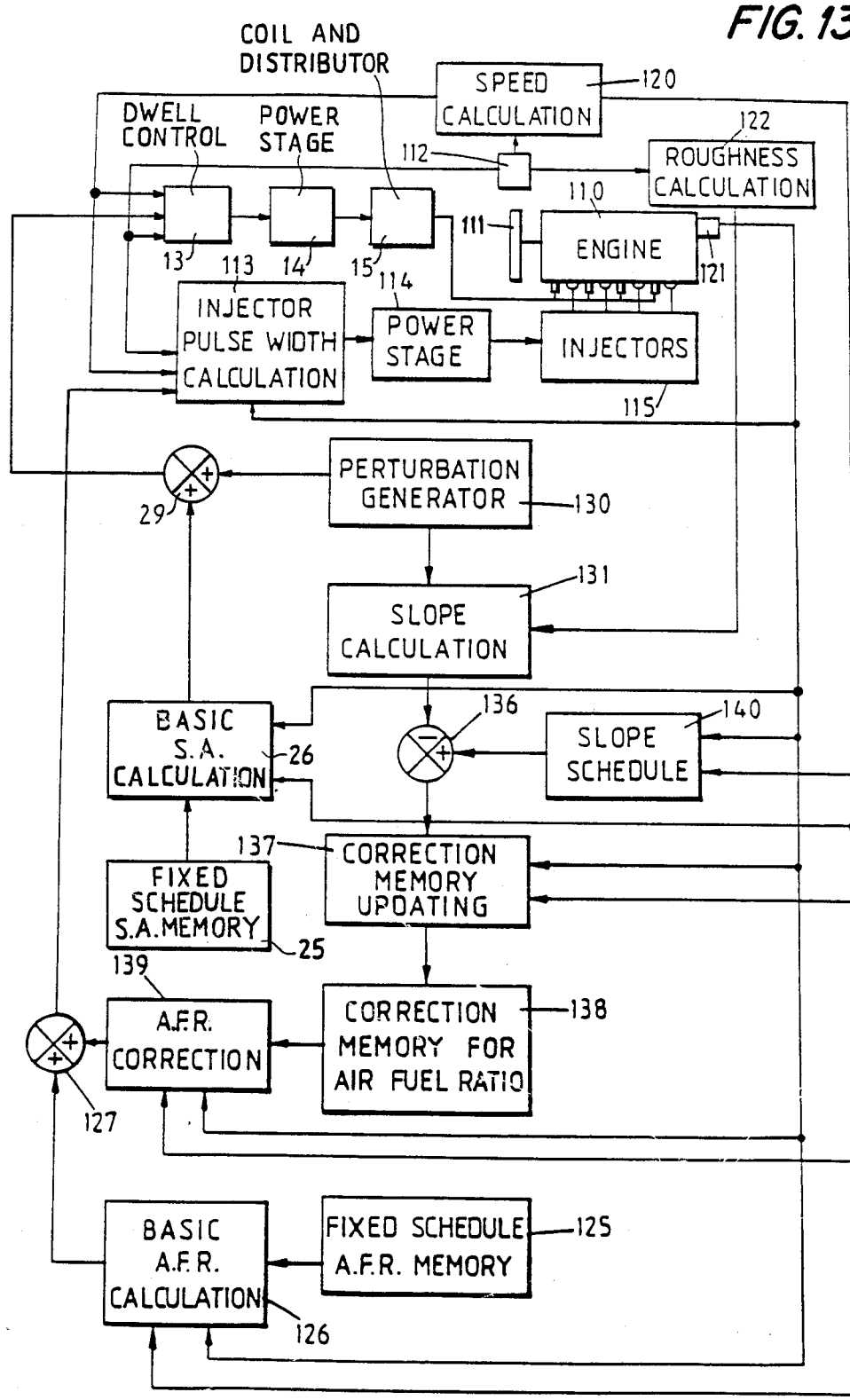
FIG. 13 is a diagram of the functional components of yet another embodiment of an adaptive control system according to the invention.

FIG. 13 illustrates an embodiment in which a first control input (spark advance angle) is perturbed about a base value, and a second control input (AFR) is corrected in response to the slope calculation made when the first control input is perturbed about its base value. Otherwise, the FIG. 13 embodiment is similar to the embodiments shown in FIGS. 2 and 11.

The above description and the accompanying drawings are merely illustrative of the application of the principles of the present invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

I claim:

1. An engine control and combustion quality detection system for an internal combustion engine having at least one control input, said system comprising:
    means for establishing a base value for a first one of said at least one control input;
    perturbations means for periodically perturbing said first control input about said base value;

a sensor for sensing an engine parameter representing combustion quality and providing an output representing said engine parameter; and slope calculation means, receiving said output from said sensor when said perturbation means perturbs said first control input about said base value, for determining a slope of said output from said sensor with respect to perturbations in said first control input indicating combustion quality of said engine.

2. A system as in claim 1, wherein said engine parameter is knock and said sensor is a knock sensor for sensing knock induced vibrations arising in said engine.

3. The system as in claim 2, wherein said first control input is an ignition timing input.

4. The system as in claim 1, wherein said engine is a spark ignition engine and said first control input is a spark advance angle.

5. A system as in claim 1, wherein said engine parameter is engine roughness and said sensor is an engine roughness sensor.

6. A system as in claim 5, wherein said first control input is an air/fuel ratio.

7. A system as in claim 1, further comprising means for establishing a base value for a particular one of said at least one control input and correcting means for correcting said base value of said particular control input responsive to said slope indicating said combustion quality of said engine.

8. A system as in claim 7, wherein said correcting means includes means for correcting said base value of said particular control input by a predetermined amount when said slope indicating combustion quality exceeds a threshold amount.

9. A system as in claim 7 or 8, wherein said correcting means includes a correction memory storing a correction schedule of correction values for said particular control input as a function of predetermined engine operating conditions and further comprising updating means for updating said correction schedule responsive to said slope indicating said combustion quality of said engine.

10. A system as in claim 1, further comprising a threshold comparator means for comparing said slope to a threshold value to determine whether said engine parameter satisfies a given threshold quality.

11. A system as in claim 9, wherein said particular control input is said first control input.

12. A system as in claim 9, wherein said particular control input is not said first control input.

13. An adaptive control system for an automobile, comprising:

an engine having at least one control input;

means for establishing a base value for a first one of said at least one control input;

perturbation means for periodically perturbing said first control input about said base value;

a sensor for sensing an engine parameter representing combustion quality and providing an output representing said engine parameter; and slope calculation means, receiving said output from said sensor when said perturbation means perturbs said control input about said base value, for determining a slope of said output from said sensor with respect to perturbations in said first control input indicating combustion quality of said engine.

14. A system as in claim 13, wherein said first control input is an ignition timing input, said engine parameter is knock and said sensor is a knock sensor for sensing knock induced vibrations arising in said engine.

15. A system as in claim 13, wherein said engine is a spark ignition engine and said first control input is a spark advance angle.

16. A system as in claim 13, wherein said first control input is an air/fuel ratio, said engine parameter is engine roughness and said sensor is an engine roughness sensor.

17. A system as in claim 13, further comprising means for establishing a base value for a particular one of said at least one control input and correction means for correcting said base value of said particular control input responsive to said slope indicating said combustion quality of said engine.

18. A system as in claim 17, wherein said correcting means includes means for correcting said base value of said particular control input by a predetermined amount when said slope indicating said combustion quality exceeds a threshold amount.

19. A system as in claim 17 or 18, wherein said correction means includes a correction memory storing a correction schedule of correction values for said particular control input as a function of predetermined engine operating conditions and further comprising updating means for updating said correction schedule responsive to said slope indicating of said combustion quality of said engine.

20. A system as in claim 13, further comprising a threshold comparator means for comparing said slope to a threshold value to determine whether said engine parameter satisfies a given threshold quality.

21. A system as in claim 19, wherein said particular control input is said first control input.

22. A system as in claim 19, wherein said particular control input is not said first control input.

23. An adaptive control system for an automobile, comprising:

an engine having at least one control input and a crank shaft;

a position transducer for generating a series of reference pulses representing rotational positions of said crank shaft;

a further control device receiving said reference pulses and providing an output signal;

a speed calculation device receiving said reference pulses to provide an output signal indicating engine speed to said surther control device;

a load demand transducer for measuring a load demand parameter of said engine;

a fixed schedule memory means storing data representing said control input as a function of engine speed and engine load demand;

a control input calculation device connected to (i) said fixed schedule memory means, (ii) said speed calculation device and (iii) said load transducer for calculating a base value for said control input;

a first summer receiving said base value;

a perturbation means for generating perturbation values for said control input;

a second summer receiving said perturbation values and having an output connected to said surther control device to provide a command value for said control input;

said further control device for controlling said control input in accordance with said command value based on said output signal of said speed calculation device and said position transducer;

a sensor for sensing an engine parameter representing combustion quality and providing an output representing said engine parameter;

a slope calculation means receiving said perturbation values from said perturbation means and said output of said sensor for determining a slope of said output of said sensor with respect to said control input thereby to provide an output representing said engine parameter;

a control input correction memory storing values for correcting said control input responsive to said output of said slope calculation means;

a third summer receiving said output of said slope calculation means and a reference input and providing an output;

a correction memory updating device receiving (i) said output of said third summer, (ii) said output of said speed calculation device and (iii) said output of said load demand transducer and providing an output to said control input correction memory to update said values stored in said control input correction memory; and a control input correction calculation means receiving (i) an output from said control input correction memory, (ii) said output from said speed calculation device and (iii) said output of said load demand transducer and providing an output to said first summer.

24. An engine control and combustion quality detection system for an internal combustion engine having an ignition timing input and an air/fuel ratio input, the system comprising a knock sensor, means for detecting engine roughness, means for establishing a first base value for the ignition timing input, means for establishing a second base value for the air/fuel ratio input, means for alternately periodically perturbing the ignition timing input about the first base value and the air/fuel ratio input about the second base value, means for determining a knock quality value as the slope of the output of the knock sensor with respect to the ignition timing input, and means for determining an engine roughness quality value as the slope of the output of the roughness detecting means with respect to the air/fuel ratio input.

25. A system as claimed in claim 24, further comprising means for correcting the ignition timing input in accordance with the knock quality value and means for correcting the air/fuel ratio input in accordance with the engine roughness quality value.

26. A method of detecting combustion quality in an internal combustion engine, said method comprising:

establishing a base value for a first control input of said engine;

periodically perturbing said first control input about said base value;

sensing an engine parameter representing combustion quality of said engine when said first control input is being periodically perturbed about said base value and providing an output representing said engine parameter; and determining a slope of said output with respect to said first control input indicating said combustion quality of said engine.

27. A method as in claim 26, wherein said first control input is an ignition timing input and said engine parameter is knock.

28. A method as in claim 26, wherein said engine is a spark ignition engine and said first control input is a spark advance angle.

29. A method as in claim 26, wherein said first control input is an air/fuel ratio and said engine parameter is engine roughness.

30. A method as in claim 26, further comprising establishing a base value for a particular control input of said engine and correcting said base value of said particular control input responsive to said slope indicating said combustion quality of said engine.

31. A method as in claim 30, further comprising correcting said base value of said particular input by a predetermined amount when said slope indicating said combustion quality exceeds a threshold value.

32. A method as in claim 31, further comprising correcting the base value for said particular control input by (a) providing a correction memory for storing a correction schedule of correction values for said control input as a function of predetermined engine operating conditions and (b) updating said correction schedule responsive to said indication of said combustion quality of said engine.

33. A method as in claim 30, 31 or 32, wherein said particular control input is said first control input.

34. A method as in claim 30, 31 or 32, wherein said particular control input is not said first control input.

35. A system as in claim 23, wherein said further control device is a dwell control device, and further comprising a fourth summer having an output connected to said second summer, and a threshold comparator receiving said output of said slope calculation means and providing an output to said fourth summer, said output of said threshold comparator being zero when said output of said slope calcuation means is less than a predetermined threshold and being set at a value greater than said perturbation value when said output of said slope calculation means is greater than said predetermined threshold.

36. A system as in claim 23, wherein said engine parameter is knock and said sensor is a knock sensor for sensing knock induced vibrations arising in said engine.

37. A system as in claim 36, wherein said at least one control input is an ignition timing input.

38. A system as in claim 23, wherein said engine is a spark ignition engine and said at least one control input is a spark advance angle.

39. A system as in claim 23, wherein said engine parameter is engine roughness and said sensor is an engine roughness sensor.

40. A system as in claim 39, wherein said at least one control input is an air fuel ratio.

* * * * *